(12) United States Patent
Herberg et al.

(10) Patent No.: US 9,192,945 B2
(45) Date of Patent: Nov. 24, 2015

(54) APPARATUS AND METHOD FOR CLARIFYING A BEVERAGE FROM A FLOWABLE SOLIDS PHASE

(75) Inventors: Wolf-Dietrich Herberg, Witten (DE); Carsten Waubke, Oelde (DE)

(73) Assignee: GEA Mechanical Equipment GmbH, Oelde (DE)

(*) Notice: Subject to any disclaimer, the term of this patent is extended or adjusted under 35 U.S.C. 154(b) by 92 days.

(21) Appl. No.: 13/812,719

(22) PCT Filed: Jul. 26, 2011

(86) PCT No.: PCT/EP2011/062796
§ 371 (c)(1),
(2), (4) Date: Aug. 8, 2013

(87) PCT Pub. No.: WO2012/013654
PCT Pub. Date: Feb. 2, 2012

(65) Prior Publication Data
US 2013/0309376 A1 Nov. 21, 2013

(30) Foreign Application Priority Data
Jul. 30, 2010 (DE) .......................... 10 2010 032 859

(51) Int. Cl.
*B04B 11/08* (2006.01)
*B04B 11/02* (2006.01)
(Continued)

(52) U.S. Cl.
CPC . *B04B 11/02* (2013.01); *A23L 2/70* (2013.01); *B04B 11/082* (2013.01); *C12H 1/061* (2013.01); *C12H 1/14* (2013.01)

(58) Field of Classification Search
CPC ........ B04B 11/02; B04B 11/06; B04B 11/08; B04B 11/082

USPC .......................................... 494/23, 25, 56, 57
See application file for complete search history.

(56) References Cited

U.S. PATENT DOCUMENTS 2,622,796 A * 12/1952 Steinacker et al. ............. 494/10
4,417,885 A 11/1983 Kohlstette et al.
(Continued)

FOREIGN PATENT DOCUMENTS

DE    1 802 676    4/1969
DE    81 30 833.7    2/1982
(Continued)

OTHER PUBLICATIONS

German Office Action for Application No. 10 2010 027 859.6, filed Jul. 4, 2011.

*Primary Examiner* — Charles Cooley
(74) *Attorney, Agent, or Firm* — Crowell & Moring LLP

(57) ABSTRACT

A separator includes a rotatable drum having a vertical rotational axis, a disk stack arranged in the drum, an inner gripper and an outer gripper that do not rotate with the drum are configured to discharge mutually-separated liquid phases. A discharge line is assigned to each gripper and is arranged in an associated gripper chamber of the drum. The inner gripper includes an inner gripper shaft and the outer gripper includes an outer gripper shaft both of which shafts protrude axially from the drum. Each associated gripper chamber, with its associated gripper, revolves on different radii with respect to the rotational axis such that a chamber is formed radially between an outer circumference of the inner gripper shaft and an inner circumference of the outer gripper shaft. A fluid is insertable into the chamber through a channel, which fluid is pressable from the chamber into the gripper chambers.

12 Claims, 2 Drawing Sheets

(51) Int. Cl.
  *C12H 1/065*  (2006.01)
  *C12H 1/14*   (2006.01)
  *A23L 2/70*   (2006.01)

(56) References Cited

U.S. PATENT DOCUMENTS

| | | | |
|---|---|---|---|
| 4,718,886 A * | 1/1988 | Mackel | 494/58 |
| 4,718,887 A * | 1/1988 | Gunn | 494/58 |
| 4,755,165 A * | 7/1988 | Gunnewig | 494/37 |
| 5,487,720 A | 1/1996 | Pace | |
| 7,485,084 B2 * | 2/2009 | Borgstrom et al. | 494/2 |
| 2008/0171645 A1 * | 7/2008 | Borgstrom et al. | 494/2 |
| 2013/0309376 A1 * | 11/2013 | Herberg et al. | 426/495 |
| 2015/0175439 A1 * | 6/2015 | Quiter et al. | |

FOREIGN PATENT DOCUMENTS

| | | | |
|---|---|---|---|
| DE | 3635059 C1 * | 6/1988 | B04B 11/02 |
| DE | 103 35 191 | 5/2005 | |
| DE | 10 2004 051 264 | 4/2006 | |
| DE | 20 2007 009 212 | 1/2008 | |

* cited by examiner

APPARATUS AND METHOD FOR CLARIFYING A BEVERAGE FROM A FLOWABLE SOLIDS PHASE

CROSS-REFERENCE TO RELATED APPLICATION

This application is a national stage of International Application PCT/EP2011/062796, filed Jul. 26, 2011, and claims benefit of and priority to German Patent Application No. 10 2010 032 859.6, filed Jul. 30, 2010, the content of which Applications are incorporated by reference herein.

BACKGROUND AND SUMMARY

The present disclosure relates to a separator including a rotatable drum having a vertical rotational axis and a disk stack arranged in the drum. Also included are an inner gripper and an outer gripper that do not rotate with the drum and are configured to discharge mutually-separated liquid phases. A discharge line is assigned to each gripper and is arranged in an associated gripper chamber of the drum. The inner gripper includes an inner gripper shaft and the outer gripper includes an outer gripper shaft both of which shafts protrude axially from the drum.

Reference is hereby made to DE 18 02 676, U.S. Pat. No. 4,417,885 and U.S. Pat. No. 5,487,720 concerning the state of the art of separators with a vertical rotational axis and two grippers or peeling discs. It is proposed in DE 18 02 676 to generate changes in flow and pressure intermittently. A tube for the supply of fluid opens into a bottom peeling chamber. An air pressure can further be decreased in the bottom peeling chamber.

A generic separator is further known from DE 10 2004 051 264 A1. A potential absorption of oxygen by the product is problematic where sensitive products such as beer are concerned. Embodiments according to the present disclosure counteract or reduce this disadvantageous effect.

Thus, the present disclosure relates to a separator including a rotatable drum having a vertical rotational axis and including a disk stack arranged in the drum. Also included are an inner gripper and an outer gripper that do not rotate with the drum and are configured to discharge mutually-separated liquid phases. A discharge line is assigned to each gripper and is arranged in an associated gripper chamber of the drum. The inner gripper includes an inner gripper shaft and the outer gripper includes an outer gripper shaft both of which shafts protrude axially from the drum. Each associated gripper chamber with its associated gripper revolves on different radii with respect to the rotational axis such that a first chamber is formed radially between an outer circumference of the inner gripper shaft and an inner circumference of the outer gripper shaft. The first chamber is configured such that a fluid is insertable into the chamber through a channel, which fluid is pressable from the first chamber into the gripper chambers. The present disclosure also relates to a method for clarifying a beverage from a flowable solids phase, the method steps comprising: providing a separator as described above; clarifying the beverage into a lighter phase using the separator; and protecting the lighter phase from oxygen contact by using an inert gas.

Accordingly, the gripper chambers with the two grippers are arranged, for example, in an annular manner coaxially relative to the rotational axis D. They may be further arranged in an axially partially offset manner with respect to each other in relation to the rotational axis D. A similarly annular chamber may be further arranged radially between the outside circumference of the inner gripper shaft and the inner circumference of the outer gripper shaft. In this chamber, a fluid, such as an inert gas, can be introduced through a channel, which gas can be pressed from the annular chamber to the gripper chambers of the rotating system.

An embodiment according to the present disclosure provides a separator with which it is easily possible to conduct an inert gas into the region of the gripper chambers in the processing of an oxygen-sensitive product in order to prevent that the product will come into contact with the oxygen in this region. In the clarification of beer from yeast, for example, the separator is especially suitable for protecting the beer as the lighter phase with the inert gas from contact with oxygen.

Although it is also known from DE 20 2007 009 212 to conduct a gas into the region of a drum head between a gripper for a lighter phase and an overflow for discharging a heavier phase, the gas is used for the purpose of displacing the separation zone in the drum. However, in accordance with an embodiment of the present disclosure, for example, it is enabled, in a constructionally simple way, to conduct an inert gas without any high pressure which could cause a displacement of the separation zone into the region between the two grippers. In accordance with an embodiment of the present disclosure, a construction with two gripper chambers and grippers which are disposed radially in a virtually "concentric" fashion with respect to each other has proved to be advantageous.

Embodiments according to the present disclosure are discussed herein and in the appended claims.

Embodiments according to the present disclosure are also shown in the enclosed drawings.

It is relevant to note that the embodiments according to the present disclosure that are shown and discussed herein are not limited to those that are shown or arranged but they can be arranged in any desired variable manner within the framework of the present disclosure. For example, the terms "above", "below", "front", "back" shall not be understood as limiting, but merely relate to a respectively shown arrangement. When individual components are explained, they can also be provided in multiple configurations. Functional reversals of the illustrated embodiments and methods described herein also are within the scope of the present disclosure.

Other aspects of the present disclosure will become apparent from the following descriptions when considered in conjunction with the accompanying drawings.

BRIEF DESCRIPTION OF THE DRAWINGS

Accordingly, FIG. 2 shows a schematic sectional view of a known separator 1 which is designed for continuous operation. The separator 1 comprises a rotatable drum 2 and an integral or multi-part non-rotatable cover 3, which cover 3 may enclose the drum 2 entirely or to a substantial extent.

DETAILED DESCRIPTION

Figure 1:
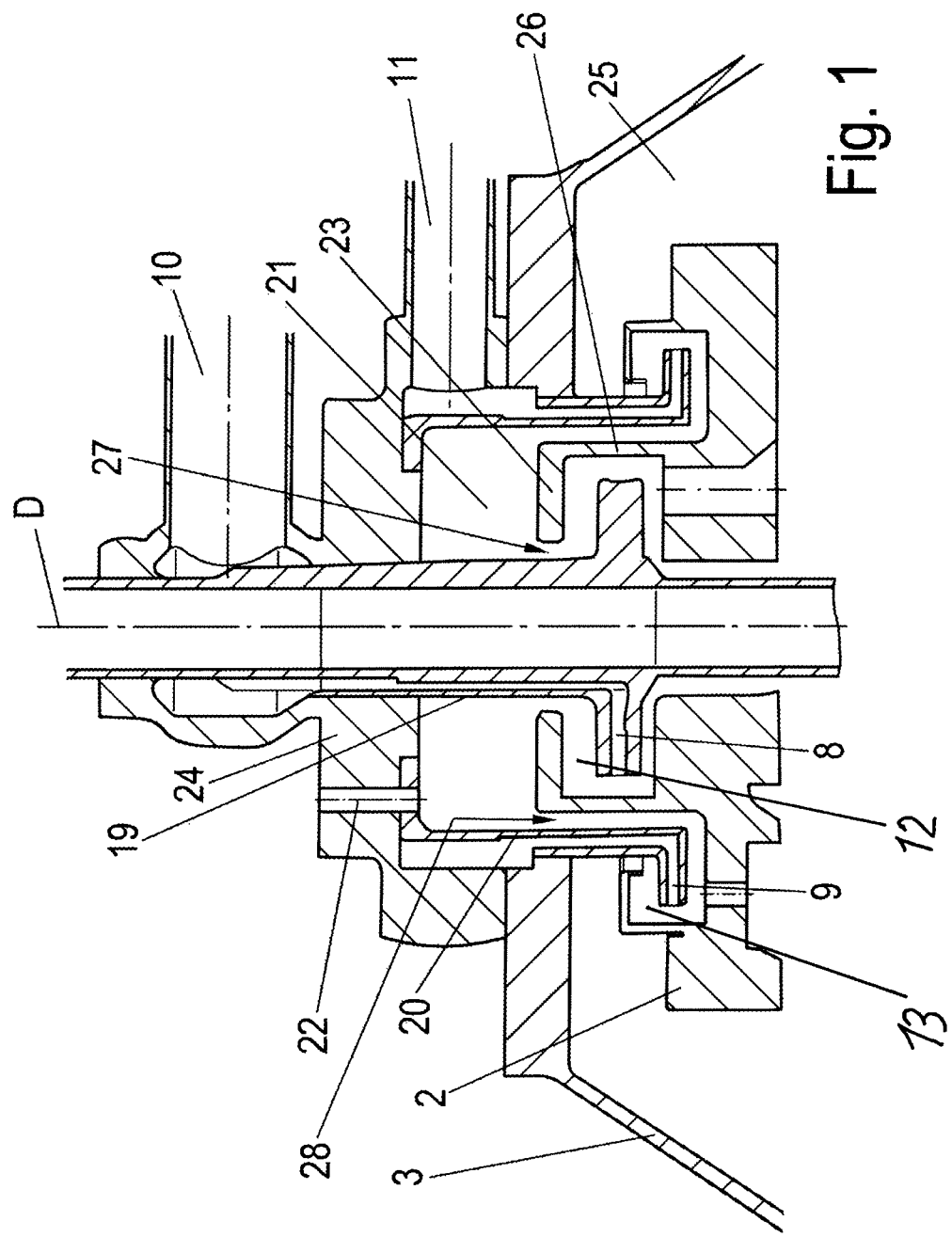
FIG. 1 shows a view of an upper region of a separator drum, in accordance with the present disclosure.
Figure 2:
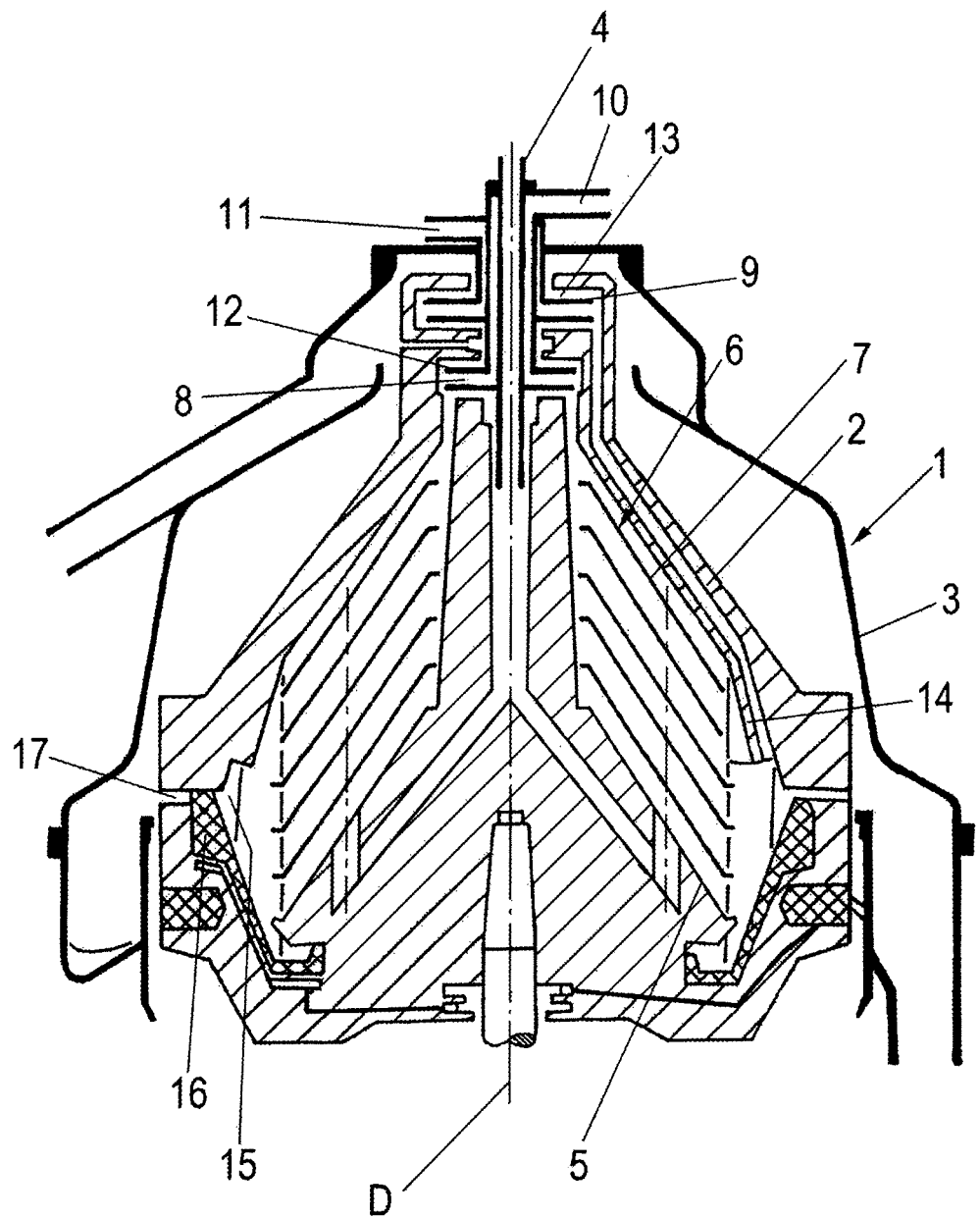
FIG. 2 shows a schematic sectional view of a known separator.

It should be noted that elements or structural features of the separator 1 of FIG. 2 may also be referred to herein with regard to current embodiments in accordance with the present disclosure related to FIG. 1. Differences may exist between certain structural elements of the known separator 1 in FIG. 2 and the embodiment of the separator 1 according to the present disclosure of FIG. 1.

The drum 2, has a vertically-oriented drum and has a rotational axis D. Drum 2 includes an inlet tube 4 which does not rotate in operation with the drum 2 and which is guided from above into the drum 2, for example. A distributor 5 is connected downstream of the inlet tube 4, by which the material to be centrifuged can be guided into the drum 2. A disc stack 6, including a plurality of conical discs 7, is arranged in the drum 2.

The discharge of fluid phases from the drum 2, of which there are two, for example, occurs via two peeling discs or grippers 8, 9, to which discharge lines 10, 11 are assigned and which are respectively arranged in gripper chambers 12, 13 which are disposed vertically on top of one another.

The grippers 8, 9 stand still in operation and do not co-rotate with the drum 2.

The lighter fluid phase will be discharged radially to the inside and then conducted by the first gripper 8 out of the rotating system, while the second fluid phase, which is heavier in comparison with the first fluid phase, is conducted via a separating disc or a channel 14 in a drum cover 26 to the second gripper chamber 13. The discharge of the heavier fluid phase occurs via second gripper 9 from the second gripper chamber 13.

The heavier fluid phase can, for example, be a still flowable pulp or yeast suspension, as is obtained, for example, in the processing of suspensions containing solid particles such as excess yeast or sludge from breweries or wineries and fruit/citrus juices.

For the discharge of further solids accumulating in the solids space 15, a piston slide valve 16 is used, as shown in FIG. 2. The piston slide valve 16 can be actuated pneumatically or hydraulically (not shown) and releases or closes solids discharge openings 17.

As referred to earlier, FIG. 2 does not show configurations or embodiments in accordance with the present disclosure and particularly with regard to the region of the grippers 8, 9 and the grippers 8, 9 themselves.

In accordance with the present disclosure, the upper region of the separator 1 in FIG. 2 may be replaced by a construction or embodiment as shown in FIG. 1. All other elements of the separator 1, such as inlet 4, distributor 5, disc stack 6, the slide valve 16, for example, are still present in the embodiment of FIG. 1.

For example, in FIG. 1 there are still two grippers 8, 9 which do not rotate in operation with the drum 2 for discharging two flowable phases.

Different than shown in FIG. 2, in FIG. 1 the grippers 8, 9 and the gripper chambers 12, 13 are not stacked vertically above one another but rather are located at virtually the same vertical height. The first gripper chamber 12 for the first gripper 8 for the lighter fluid phase discharged to the inside is arranged further to the inside, that is, radially, relative to the rotational axis D. The second gripper chamber 13 for the second gripper 9 for the heavy flowable phase which is tapped further to the outside is arranged further to the outside, that is, radially, in the drum 2. The radial offset of the gripper chambers 12, 13, which extend annularly about the rotational axis D, shall be understood in such a way that the two gripper chambers 12, 13 extend on different radii in an circular annular, or circular, or ring-like manner about the rotational axis D. As a result, the two gripper chambers 12, 13 are disposed coaxially with respect to each other. The two gripper chambers 12, 13 are further disposed in a partially axially offset manner with respect to each other, which is an advantageous embodiment in accordance with the present disclosure.

The two gripper chambers 12, 13 are arranged in the rotating drum 2. There are shafts 19, 20 of the grippers 8, 9, respectively, that are guided upwardly out of the drum 2.

The gripper chambers 12, 13 are, respectively, enclosed by gripper chamber covers 23, 24, with the outer gripper 9 including its own gripper chamber cover 24 which does not co-rotate in operation and which is disposed vertically above the gripper chamber cover 23 which rotates in operation and which is configured to be formed by an upper section of the drum cover 26.

An annular chamber 21 is formed between the outside circumference of the inner gripper shaft 19 and the inner circumference of the outer gripper shaft 20. A fluid, such as an inert gas, can be introduced into chamber 21 through a channel 22 in the vertically upper gripper chamber cover 24 and through which chamber 21 the two shafts 19, 20 pass outside of the rotating system. The inert gas can be pressed from the chamber 21 into the gripper chambers 12, 13 of the rotating system, and particularly beneath the outer gripper 9. The annular chamber 21 is arranged axially above the two gripper chambers 12, 13 with regard to the vertical rotational axis D. The annular chamber 21 is connected to gripper chambers 12, 13 by fluid paths 27, 28, respectively. Fluid paths 27, 28 originate from a bottom of chamber 21 and are arranged in an annular way beneath the chamber 21 between an inner circumference of a bottom of gripper chamber cover 23, which, for example, rotates during an operation of the drum 2, and inner gripper shaft 19, which is stationary in an operation. The annular chamber 21 is further arranged between an outside circumference of the gripper chamber cover 23 and an inner circumference of outer gripper shaft 20, which is stationary during an operation of the drum 2.

By injecting inert gas, such as $CO_2$, air or oxygen is prevented, in a simple but effective manner, from entering the gripper chambers 12, 13, and particularly the inner gripper chamber 12 for tapping the actual product. This is advantageous, for example, in the clarification of the beer from yeast, because no oxygen can reach the product, that is, the beer.

If discharges of the separator drum 2 are performed, a negative pressure can occur in the drum 2 which is compensated by the inert gas.

A cleaning fluid can, for example, be introduced in cleaning processes instead of a gas, so that simple and thorough cleaning of the system is enabled, in accordance with the present disclosure.

The heavy phase, which is still flowable, can also be discharged by a nozzle, for example, a viscon nozzle, instead of a separator disc, for example, disc 14. In contrast to standard nozzles, viscon nozzles, for example, are known from the applicant for biomass concentrations, guarantee a virtually constant biomass concentration even in the case of fluctuating feed quantities and concentrations by automatic internal concentration control. The viscon nozzle (not shown) will then be provided upstream in the discharge direction of the outer gripper chamber 13. It provides concentration control of the heavier phase which is still flowable, such as a yeast phase in the production of beer.

An additional space 25 is arranged between the cover 3 and the drum 2. Additional space 25, in accordance with the present disclosure, can also be supplied with an inert gas such as $CO_2$. The inert gas may, for example, be provided by an optional feed (not shown).

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A separator comprising:
   a rotatable drum having a vertical rotational axis and including a disk stack arranged in the drum;
   an inner gripper and an outer gripper that do not rotate with the drum and are configured to discharge mutually-separated liquid phases;
   a discharge line is assigned to each gripper and is arranged in an associated gripper chamber of the drum;
   the inner gripper includes an inner gripper shaft and the outer gripper includes an outer gripper shaft both of which shafts protrude axially from the drum;
   each associated gripper chamber with its associated gripper revolves on different radii with respect to the rotational axis such that a first chamber is formed radially between an outer circumference of the inner gripper shaft and an inner circumference of the outer gripper shaft; and
   the first chamber is configured such that a fluid is insertable into the first chamber through a channel, which fluid is pressable from the first chamber into the gripper chambers.

2. The separator according to claim 1, wherein the two gripper chambers are arranged coaxially with respect to each other.

3. The separator according to claim 1, wherein the two gripper chambers are arranged axially offset with respect to each other.

4. The separator according to claim 1, wherein the first chamber is formed as an annular chamber with respect to the rotational axis.

5. The separator according to claim 4, wherein the annular chamber is delimited above the annular chamber by a first gripper chamber cover and below the annular chamber by a second gripper chamber cover.

6. The separator according to claim 5, wherein the annular chamber is arranged axially above the two gripper chambers relative to the vertical rotational axis and is connected with the gripper chambers via fluid paths.

7. The separator according to claim 6, wherein a first of the fluid paths is arranged between an inner circumference of the second gripper chamber cover and the inner gripper shaft on the one hand and between an outer circumference of the second gripper chamber cover and the inner circumference of the outer gripper shaft on the other hand.

8. The separator according to claim 5, wherein each gripper chamber is enclosed by one of the first or second gripper chamber covers, and the outer gripper associated with the first gripper chamber cover which does not co-rotate with the drum and is disposed vertically above the second gripper chamber cover.

9. The separator according to claim 1, further comprising a solids discharge system including a piston slide valve for opening and closing a solids discharge opening in the drum.

10. The separator according to claim 1, wherein a space, configured to be supplied with an inert gas, is arranged between a cover and the drum, which cover encloses the drum and does not rotate in an operation of the drum.

11. A method of clarifying a beverage from a flowable solids phase, the method steps comprising:
    providing a separator according to claim 1;
    clarifying the beverage into a lighter phase using the separator; and
    protecting the lighter phase from oxygen contact by using an inert gas.

12. The method according to claim 11, wherein the inert gas is $CO_2$.

* * * * *